United States Patent [19]

Capizzo et al.

[11] Patent Number: 5,528,381

[45] Date of Patent: Jun. 18, 1996

[54] SYSTEM APPARATUS AND METHOD FOR IDENTIFYING VIDEO FRAMES SUITABLE FOR FREEZE-FRAME VIEWING

[75] Inventors: Vincent Capizzo, Bloomfield Hills; Michael E. Hennessey, Detroit, both of Mich.

[73] Assignee: Producers Color Service, Inc., Southfield, Mich.

[21] Appl. No.: 302,231

[22] Filed: Sep. 8, 1994

Related U.S. Application Data

[63] Continuation of Ser. No. 892,124, Jun. 2, 1992, abandoned.

[51] Int. Cl.$^6$ ............................................. H04N 5/76
[52] U.S. Cl. ................................... 358/335; 358/346
[58] Field of Search ............................ 358/335, 342, 358/311, 345, 346, 312; 360/33.1, 35.1, 13.1, 15; 348/910, 452, 441, 97, 443, 454; H04N 5/76, 5/782

[56] References Cited

U.S. PATENT DOCUMENTS

| | | | |
|---|---|---|---|
| 4,403,250 | 9/1983 | Kellar | 358/335 |
| 4,901,161 | 2/1990 | Giovanella | 358/346 |
| 4,920,423 | 4/1990 | Shiota | 358/335 |
| 4,998,167 | 3/1991 | Jaqua | 348/443 |
| 5,036,393 | 7/1991 | Samad et al. | 358/105 |
| 5,138,503 | 8/1992 | Nishida | 360/35.1 |
| 5,177,610 | 1/1993 | Wilkinson | 358/105 |
| 5,249,065 | 9/1993 | Juso et al. | 358/335 |
| 5,255,091 | 10/1993 | Lyon et al. | 348/443 |

FOREIGN PATENT DOCUMENTS 3926481  2/1990  Germany  ........................ H04N 5/782

*Primary Examiner*—Thai Q. Tran
*Assistant Examiner*—Huy Nguyen
*Attorney, Agent, or Firm*—Barnes, Kisselle, Raisch, Choate, Whittemore & Hulbert

[57] ABSTRACT

A system, apparatus and method for automatically identifying frames of information in video format consisting of fields taken from the same frame or substantially similar frames of information in film format, and distinguishing such video frames from video frames consisting of fields taken from adjacent film frames. The sequential scan lines of successive video frame fields are filtered to remove high frequency fine detail, and are then compared pixel by pixel to corresponding pixels in the adjacent field. If the two fields within a video frame are substantially identical, the frame is identified as one containing fields from the same film frame or substantially similar frames and suitable for freeze-frame viewing.

19 Claims, 2 Drawing Sheets

SYSTEM APPARATUS AND METHOD FOR IDENTIFYING VIDEO FRAMES SUITABLE FOR FREEZE-FRAME VIEWING

This application is a continuation of Application Ser. No. 07/892,124 filed Jun. 2, 1992, now abandoned The present invention is directed to recording and/or playback of video information, and more particularly to identification of video information frames composed of substantially identical fields. Yet more specifically, the invention relates to transfer of motion picture or video information recorded at a first frame speed onto video tape or disc in a format for viewing at a different frame speed, and to identifying the video tape or disc frames suitable for freeze-frame viewing during playback.

BACKGROUND AND OBJECTS OF THE INVENTION

The process of transferring motion picture video material to video tape or disc involves a change in the rate at which the video frames are displayed from the respective media. In the U.S., film is conventionally projected at a rate of twenty-four frames per second, while video tape or disc is standardized to run at a nominal rate of thirty frames per second. To minimize flicker, each video frame is scanned twice, at double the frame rate, to provide two half-frames called fields. One field contains odd-numbered scanned lines; the other field contains even-numbered scanned lines. This technique is referred to as interlaced scanning.

The difference in frame rate between the film and video is addressed by a process illustrated in FIG. 1 that takes advantage of the interlaced video scanning technique. Since the video and film frame rates have a 5/4 ratio, every four film frames 10, 12, 14, 16 must be recomposed to form five video frames 18, 20, 22, 24, 26, each consisting of two fields, or a total of ten fields from the four film frames 10–16. To meet this requirement, alternate film frames are scanned to form three video fields (film frames 10 and 14) or two video fields (film frames 12 and 16). This process, referred to as 3:2 pulldown, yields three video frames 18, 24 and 26 composed of two fields from a single film frame, and two video frames 20, 22 composed of fields from adjacent film frames, for every sequence of four consecutive film frames and five corresponding video frames. When the video medium is viewed at normal speed, the fact that the frames 20, 22 are composed of fields from adjacent film frames does not present a problem. However, if either frame 20 or 22 is viewed in a freeze-frame mode, the video anomalies caused by obtaining the interlaced fields from adjacent film frames can cause annoying jitter on the viewing screen. It is therefore desirable to provide a mechanism for enabling viewing of video frames 18, 24 and 26 in a freeze-frame mode, while preventing viewing of frames 20 and 22. The present invention is directed to this need.

Conventionally, attempts have been made to identify the video frames suitable for freeze/frame viewing by manually observing the 3:2 pulldown sequence illustrated in FIG. 1, and thereafter coding the video frames by number under the assumption that the sequence illustrated in FIG. 1 is repeated throughout the video medium. However, the sequence illustrated in FIG. 1 can be changed or interrupted due to editing, for example, requiring that the sequence thereafter be manually reestablished. Furthermore, this manual process becomes more tedious and complex in the event that the film is run at a non-standard or variable film speed. For example, very old motion pictures were recorded using cameras cranked by hand, often resulting in significant variation in film speed from the twenty-four frame-per-second standard speed. Indeed, prior to implementation of the present invention, it had been considered all but impossible to transfer these early motion picture materials to video tape or disc while at the same time identifying video frames suitable for freeze-frame viewing as outlined above.

It is therefore a general object of the present invention to provide a system, apparatus and method for identifying frames of video information consisting of substantially identical fields suitable for freeze-frame viewing that operate automatically without operator intervention, that automatically accommodate variations in film speed, and/or that enable freeze-frame viewing of video frames consisting of fields that are sufficiently similar to each other as to reduce or eliminate the annoying jitter that would otherwise result. Another and related object of the present invention is to provide a system and method for transferring frames of video information from one medium such as motion picture film to another medium such as video tape or disc having a differing frame rate that automatically identify the video frames on the second medium consisting of fields drawn from the same frame or substantially similar frames of the first medium, termed "clean" video frames hereinafter, and that distinguish such frames from video frames on the second medium consisting of fields drawn from adjacent frames on the first medium that are not substantially similar. Another and related object of the present invention is to provide a system and method for identifying such frames on the second medium in such a way as to enable freeze-frame playback of the second medium only of frames composed of fields drawn from the same frame or sufficiently similar frames or fields of the first medium.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

The present invention will be discussed in connection with FIGS. 2–4, primarily in relation to manufacture of a video disc such as a DRAW or worm disc for subsequent play-back of a motion picture, or for creation of a master disc for subsequent mass production of video disc replicas of the film. Techniques for recording information on a video DRAW disc and/or a video disc master are well known, and do not per se form part of the present invention. It will also be appreciated as the description unfolds that the present invention is by no means restricted to this presently preferred implementation thereof.

Figure 1:
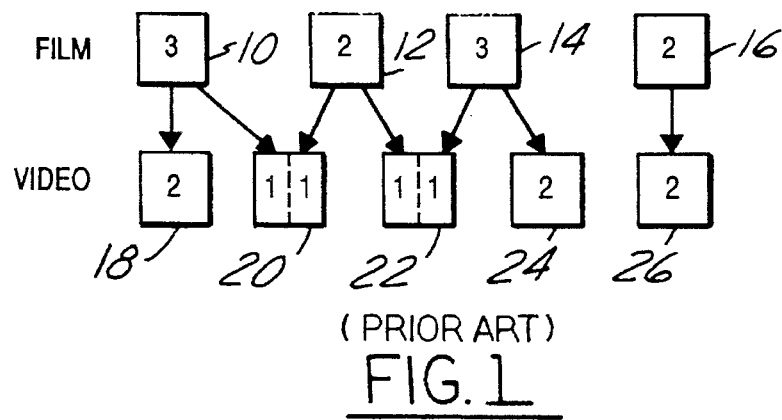
FIG. 1 is a schematic diagram that illustrates the 3:2 pulldown sequence for transferring motion picture material to video tape or disc as discussed above.
Figure 2:
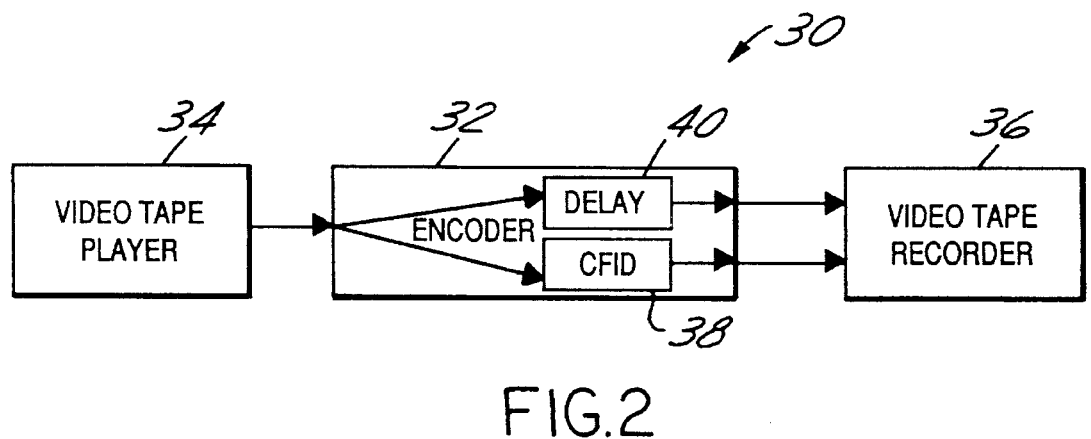
FIG. 2 is a functional block diagram of a system for identifying clean frames of video information in accordance with a presently preferred embodiment of the invention.

FIG. 2 illustrates a system 30 in accordance with one aspect of the present invention as including an encoder 32 for receiving video information from a video tape player 34, and transferring such video information to a video tape recorder 36 along with information indicative of the clean frames of video information suitable for freeze-frame playback. For purposes of the present application, the term "clean" frames of video information or data refers to frames 18, 24, 26 in FIG. 1 in which the two fields are composed from a single film frame, as distinguished from video frames 20, 22 in which the two fields come from adjacent film frames. In system 30 of FIG. 2, it is assumed that the motion picture material has already been transferred to video tape, which is to say that the 3:2 pulldown transfer sequence illustrated in FIG. 1 has already been performed in the conventional manner. The video tape in player 34 thus consists of sequential video frames of the type 18–26 in FIG. 1, although not necessarily of the exact repetitive sequence illustrated in FIG. 1.

The task of encoder 32 in FIG. 2 is thus to identify and distinguish clean frames 18, 24, 26, and for this purpose a clean frame identify (CFID) module 38 is included in encoder 32, along with a delay 40 that receives and delays the video information received from player 34, but otherwise does not operate on the video information. Encoder 32 thus provides a first output to video tape recorder 36 from delay 40 consisting of an exact or substantially exact but delayed replica of the video information received from player 34, and an indication from CFID 38 for recording on an unused audio channel at recorder 36 indicative of clean frames of video data suitable for freeze-frame viewing. Delay 40 is thus substantially of one video frame duration. Delay 40 may be eliminated, and the video transferred directly from player 34 to recorder 36 with suitable synchronization for clean frames previously identified by module 38.

Figure 3:
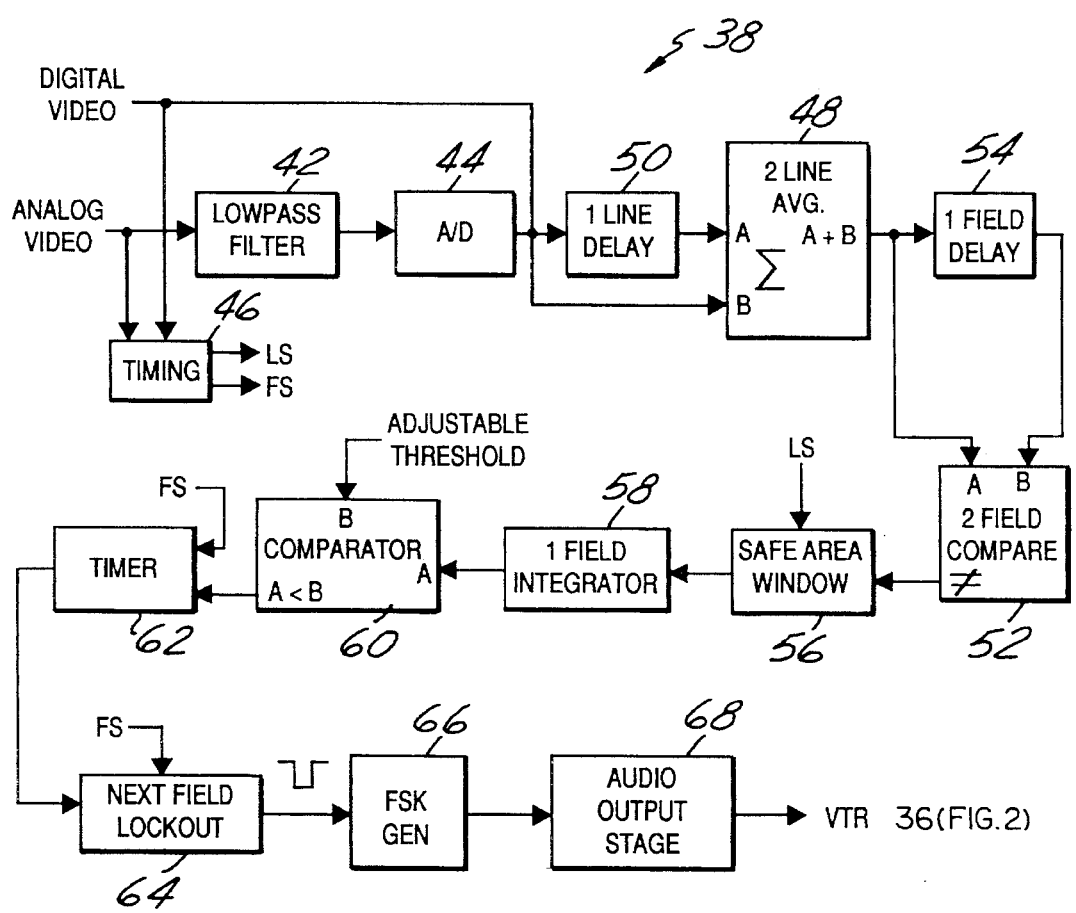
FIG. 3 is a more detailed functional block diagram of a portion of the system illustrated in FIG. 2.

CFID module 38 is illustrated in greater detail in FIG. 3. The video input may be in either analog or digital format. If the video input is in analog format, the input a directed through a low-pass filter 42 to an a/d converter 44 for converting each scan line of analog data into a sequence of picture element signals or pixels in digital format. Low-pass filter 42, which preferably has a cutoff frequency of about 2.5MHz, removes high frequency information representative of fine video detail that is not of interest for purposes of clean frame identification. The video input information, whether in analog or digital format, is also directed to a timing circuit 46 for generation of a line-start signal LS at the onset of each video scan line, and a field-start signal FS at the beginning of each video field. The timing signals LS and FS are employed for synchronizing the remainder of the CFID circuitry.

The digital video data, whether received directly as a video input in digital format or converted from analog to digital format by converter 44, is fed to one input of an averaging circuit 48, and through a one-line delay 50 to a second input of averaging circuit 48. The purpose of averaging circuit 48 and delay 50 is to average corresponding pixels of each sequential pair of scan lines within each field, and thereby additionally remove high frequency information from the video data indicative of fine detail not of interest for clean frame identification purposes. Averaging circuit 48 in the preferred embodiment of the invention comprises a summer that adds corresponding pixels to each other from sequential scan lines, and feeds the sum, which is equal to the average of the two pixels multiplied by two, to the output of averaging circuit 48. The time delay of delay 50 is, of course, equal to the total time for a single scan line.

The output of summer 48 is connected to one input of a comparator 52, and through a one-field delay 54 to the other input of comparator 52. The time delay of delay circuit 54 is equal to the time between onset of sequential fields of video information—e.g., nominally ¹⁄₆₀ sec. in the video standard discussed above. Comparator 52 thus receives at its two inputs corresponding pixels from sequential fields. These pixels are presented serially for each scan line, line by line for each field. Thus, the first pixel of the first scan line of the first field is compared to the first pixel of the first scan line of the second field (which is actually the first pixel of the second scan line of the frame), and so forth in sequence. Comparator 52 compares the sequentially presented digital bytes to each other, and provides at its output sequential digital data indicative of any difference therebetween.

The output of comparator 52 is fed to a circuit 56 responsive to the line-start synchronization signal LS for blocking or ignoring the comarator output at the beginning and end of each scan line, and thereby ignoring edge effects that could otherwise occur at the edges of the video frame. Preferably, circuit 56 defines a window composed of the central 90% of each frame for purposes of enabling comparison at comparator 52. The output of circuit 56 is fed to an integrator 58, which effectively accumulates the sum of all pixel comparisons at comparator 52 for that portion of each video field enabled by circuit 56. The output of integrator 58 is fed to a comparator 60, which compares the accumulated difference signal from comparator 52 to a threshold adjustably determined or preset by an operator. The threshold is determined essentially empirically by viewing both clean and "unclean" frames of video data, and selecting a suitable threshold for distinguishing therebetween. It has been found that the field comparison technique hereinabove described, particularly in combination with the filtering of unnecessary high-frequency signal components, easily distinguishes between clean and unclean video information frames, and the setting of the threshold input to comparator 60 is in no way critical.

The output of comparator 60 is fed to a timer 62, which also receives signal FS from timer 46 indicative of the start of a new video field. The purpose of timer 62 is to time the output signal of comparator 60, which is the clean frame identification information, to VTR 36 (FIG. 2) in association with delay 40 so that the clean frame identifying information recorded on the tape at VTR 36 is properly synchronized with the corresponding video frames. Timer 62 is connected to a lockout circuit 64, which also receives field-start timing signal FS, for enabling generation of the clean frame identifying signal only in conjunction with alternate video fields—i.e. once per video frame. The output of lockout circuit 64 controls a frequency shift key or FSK generator 66, which generates an audio signal fed through an output amplifier stage 68 to VTR 36 (FIG. 2). An audio signal is thereby recorded on a spare audio or cue track of the video tape in VTR 36 at a time appropriate for identification of each "clean" frame of video information prior to the time at which the video frame is recorded on VTR 36 through delay 40 (FIG. 2) or the like. The video input to VTR 36 thus includes all audio and video information from player 34, as well as properly synchronized clean frame identifying information in a spare audio or cue track.

Figure 4:
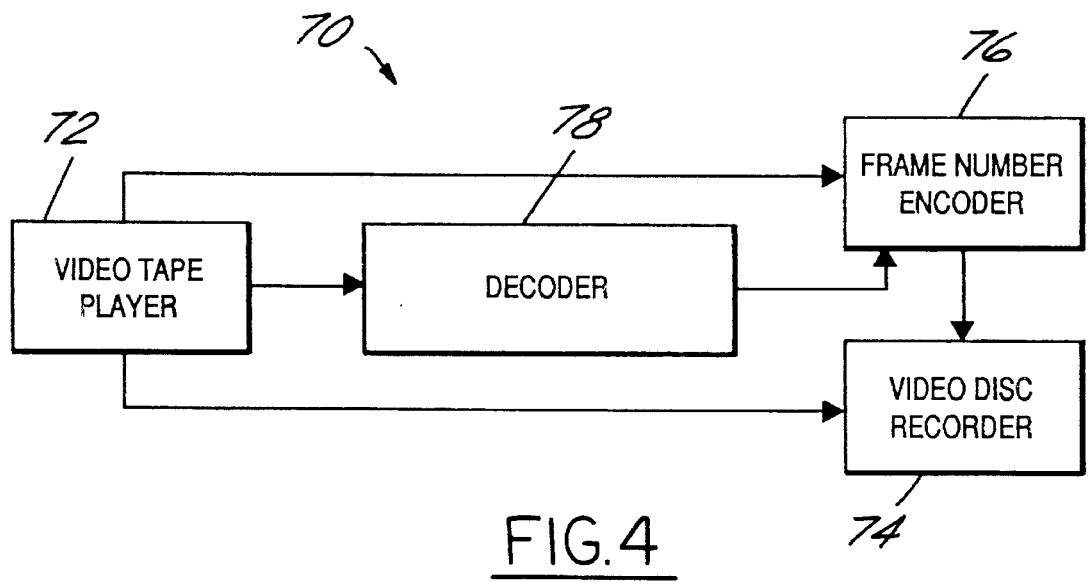
FIG. 4 is a functional block diagram of a system for recording video information onto video disc with clean frames identified on the video disc in accordance with the present invention.

FIG. 4 illustrates a system 70 for employing a video tape so recorded in VTR 36 to generate a video disc. A video tape player 72 has separate output channels for feeding audio information directly to a video disc recording system 74, for feeding video and video time code information to a video frame number encoder 76, and for feeding the CFID signal recorded in the separate audio or cue track to a CFID decoder 78. Player 72, frame number encoder 76 and video disc recording system 74 are of suitable conventional construction. However, with the addition of decoder 78, encoder 76 may now place, in the vertical blanking interval between alternate pairs of video fields, suitable information for indicating the onset of a clean video frame. Such indication may take the form of a flag, for example, preceding or for forming part of the video frame number. This information is thus recorded on the video disc in an otherwise conventional manner by recording system 74 in a format suitable for recognition by a video disc player to identify clean frames of video information suitable for still-frame viewing on a monitor or screen connected to the video disc player.

The system, apparatus and method of the present invention have been described for particular application in generation of so-called constant angular velocity video discs, in which video frame numbers and other information (including the clean-frame identifying signal generated by the present invention) are recorded in the disc itself at the onset of each video frame. However, it will be recognized that the invention in its broadest aspects is by no means limited to this specific, albeit presently preferred, implementation. Indeed, the invention enjoys utility in any full-motion video system in which it is desired to identify clean frames of video information for viewing. For example, the clean frame identifying module 38 illustrated in FIG. 3 may be incorporated into an otherwise conventional video disc player or video tape player having frame memory capability to identify and enable freeze-frame viewing of only clean frames in substantially real time. As previously noted, and although the present invention finds particular application and utility in connection with 3:2 pulldown of video information in transferring motion pictures to video tape or disc, the invention in its broadest aspects is by no means limited to any specific frame rate, or for that matter to a constant frame rate in the input signal. In this connection, the present invention automatically accommodates varying input frame rate associated with early motion pictures recorded using hand-operated cameras.

The present invention has also been described in conjunction with identifying frames of video information on the second medium that consist of fields taken from the same frame in the first medium. Of course, where there is no substantial difference between successive frames on the first medium, such as when the video information reflects a still picture, a frame on the second medium that consists of fields from adjacent frames on the first medium would be clean enough for still projection without jitter, and would be identified as a clean frame in accordance with the invention. Thus, the invention seeks to identify frames of video information in the second medium that consist of fields taken from the same frame or substantially similar frames on the first medium.

We claim:

1. In a system for transferring frames of video information from a first medium having a first frame rate to a second medium having video format and a second frame rate different from said first frame rate, apparatus for identifying frames of video information on said second medium in video format having fields of video data taken from the same video frame or substantially similar frames on said first medium, said apparatus comprising: means for comparing fields of video data to each other within each frame of video information on said second medium, means for indicating as a function of such comparison whether the fields of video data within each said frame on said second medium originated within the same frame or substantially similar frames of video information on said first medium, and means responsive to said indicating means for recording information on said second medium, separate from said video information on said second medium, indicative of frames of video information on said second medium containing fields that originated within the same frame or substantially similar frames on said first medium.

2. The system set forth in claim 1 wherein said means for comparing fields of video data comprises means for receiving sequential fields of video data for each video frame, means for delaying a first of said sequential fields for each said frame for a time corresponding to scan time for one field, and video data comparing means having a first input coupled to said delaying means and a second input coupled to said receiving means.

3. The system set forth in claim 2 wherein said video data comparing means comprises means for comparing to each other individual pixels of video data received in sequence at said first and second inputs, and means for indicating a difference between said pixels as a function of each such comparison.

4. The system set forth in claim 3 wherein said indicating means includes means responsive to said comparison of individual pixels for accumulating differences between successive pixel comparisons at said first and second inputs for each said video frame, means for comparing said accumulated differences to a preselected threshold, and means for indicating that the fields of video data within each said frame on said second medium originated within the same video frame on said first medium when said accumulation remains below said threshold for a given video frame.

5. The system set forth in claim 4 wherein said receiving means further includes means for filtering high frequency video data from said video information.

6. The system set forth in claim 5 wherein said filtering means comprises means for averaging sequential video data scan lines with each other.

7. The system set forth in claim 6 wherein averaging means comprises means for delaying each scan line of video data for a time corresponding to scan time of one said line, and video data averaging means having a first input coupled to said scan line delaying means and a second input coupled to said receiving means.

8. The system set forth in claim 7 wherein said video data averaging means comprises means for averaging with each other individual pixels of video data received in sequence at said first and second inputs of said averaging means.

9. The system set forth in claim 8 wherein said filtering means further comprises means for receiving video information in analog format, and means for converting said analog video information to digital format consisting of digital bytes corresponding to each said pixel of video data.

10. The system set forth in claim 9 wherein said filtering means further comprises low-pass filtering means for feeding low frequency analog video data to said converting means.

11. The system set forth in claim 10 wherein said low-pass filtering means has a pass band below 2.5 MHz.

12. The system set forth in claim 4 wherein said indicating means further comprises means for enabling operation of said accumulating means for a central portion of each said video frame.

13. The system set forth in claim 2 wherein said means for recording information comprises means for recording said information on an audio track of said second medium.

14. The system set forth in claim 1 wherein said means for recording information comprises means for recording said information during blank intervals between successive fields of video data.

15. A method of transferring sequential frames of video information from a first medium having a first frame scan rate to a second medium having a second frame scan rate different from said first rate, said method comprising the steps of:

(a) scanning sequential frames of video information on said first medium to create at least two video fields for each frame on said first medium consisting of interlaced scan lines, (b) composing and recording on said second medium frames of video information in which each frame on said second medium consists of either two fields from a single frame on said first medium or two fields from adjacent frames on said first medium, all fields of video information on said first medium being recorded on said second medium, (c) for each frame of video information on said second medium in sequence, comparing one field of the frame to the other field of the frame to determine which such frames on said second medium consist of two fields from the same frame or substantially similar frames on said first medium or from adjacent non-identical frames on the first medium, and (d) recording information on said second medium, separate from said video information on said second medium, indicative of video frames on said second medium consisting of fields from the same frame or substantially similar frames on said first medium in such a way that said frames of video information on said second medium consisting of fields from the same frame or substantially similar frames on said first medium can be identified during play-back of said second medium and distinguished from frames on said second medium consisting of fields from adjacent non-identical frames on said first medium.

16. The method set forth in claim 15 wherein said step (d) comprises the step of identifying by number said video frames on said second medium consisting of fields for the same frame or substantially similar frames on said first medium.

17. The method set forth in claim 15 wherein said step (c) comprises the steps of:

(c1) separating each field into scan lines consisting of sequential digital pixels, and (c2) comparing to each other corresponding pixels of the fields of each frame on said second medium.

18. The method set forth in claim 17 comprising the additional step of: (e) filtering high frequency video information from said sequential digital pixels prior to said step (c1).

19. The method set forth in claim 18 wherein said step (e) comprises the step of: for each said field, averaging each pixel of each scan line in turn with the corresponding pixel of the adjacent scan line in the field.

* * * * *